(12) United States Patent
Lee et al.

(10) Patent No.: US 10,585,512 B2
(45) Date of Patent: Mar. 10, 2020

(54) TOUCH DISPLAY DEVICE AND METHOD OF DRIVING THE SAME

(71) Applicant: LG Display Co., Ltd., Seoul (KR)

(72) Inventors: Ki-Jeong Lee, Gumi-si (KR); Yun-Jong Choi, Chilgok-gun (KR)

(73) Assignee: LG DISPLAY CO., LTD., Seoul (KR)

( * ) Notice: Subject to any disclaimer, the term of this patent is extended or adjusted under 35 U.S.C. 154(b) by 63 days.

(21) Appl. No.: 15/959,026

(22) Filed: Apr. 20, 2018

(65) Prior Publication Data

US 2018/0307357 A1 Oct. 25, 2018

(30) Foreign Application Priority Data

Apr. 20, 2017 (KR) .................. 10-2017-0051229

(51) Int. Cl.
| | | |
|---|---|---|
| *G06F 3/041* | (2006.01) | |
| *G06F 3/044* | (2006.01) | |
| *G09G 3/20* | (2006.01) | |
| *G09G 3/3225* | (2016.01) | |
| *G09G 3/36* | (2006.01) | |

(52) U.S. Cl.
CPC ............ *G06F 3/0412* (2013.01); *G06F 3/044* (2013.01); *G06F 3/0416* (2013.01); *G09G 3/20* (2013.01); *G09G 3/3225* (2013.01); *G09G 3/3696* (2013.01); *G09G 2310/0297* (2013.01); *G09G 2310/08* (2013.01); *G09G 2330/028* (2013.01)

(58) Field of Classification Search
None
See application file for complete search history.

(56) References Cited

U.S. PATENT DOCUMENTS

| | | | | |
|---|---|---|---|---|
| 2015/0332638 A1* | 11/2015 | Li | ................. | G09G 3/3648 345/214 |
| 2018/0107309 A1* | 4/2018 | Endo | ................. | G06F 3/0412 |

FOREIGN PATENT DOCUMENTS

KR   1020160037381 A   4/2016

* cited by examiner

*Primary Examiner* — Gustavo Polo
(74) *Attorney, Agent, or Firm* — Seed IP Law Group LLP

(57) ABSTRACT

A touch display device includes: a timing controlling unit generating a touch synchronizing signal, an image data, a data controlling signal and a gate controlling signal; a micro controlling unit generating first to third selecting signals; a touch power unit including a MUX input part and a MUX part, the MUX input part deactivated during a display period and activated during a touch period, the MUX part generating a modified common voltage and first and second gate low voltages; a data driving unit generating a data voltage; a gate driving unit generating a modified gate voltage; and a touch display panel displaying an image during the display period and sensing a touch during the touch period.

20 Claims, 5 Drawing Sheets

TOUCH DISPLAY DEVICE AND METHOD OF DRIVING THE SAME

CROSS-REFERENCE TO RELATED APPLICATION

This application claims the benefit under 35 U.S.C. § 119(a) of Korean Patent Application No. 10-2017-0051229, filed on Apr. 20, 2017, in the Korean Intellectual Property Office, which is incorporated herein by reference in its entirety.

BACKGROUND

Technical Field

The present disclosure relates to a touch display device, and more particularly, to a touch display device where a power consumption is reduced by deactivating a MUX input part of a touch power unit during a display period and a method of driving the touch display device.

Description of the Related Art

As the information age progresses, display devices have rapidly advanced and various flat panel display (FPD) devices have been developed. For example, the FPDs include a liquid crystal display (LCD) device, a plasma display panel (PDP) device, an organic light emitting diode (OLED) display device and a field emission display (FED) device. Since the FPD devices have advantages such as a thin profile, a light weight and a low power consumption, cathode ray tube (CRT) devices have been widely substituted by the FPD devices.

Recently, a touch display device where a touch panel is disposed over a display panel has been a subject of research. The touch display device is used as an output unit displaying an image and as an input unit receiving an order of a user by a touch of a specific portion of the image. The touch panel may be classified into a pressure sensing type, a capacitance type, an infrared type and an ultrasonic type according to a sensing type.

When a user watches the image displayed by the display panel and touches the touch panel, the touch panel detects a position information of the corresponding portion and recognizes an order of the user by comparing the detected position information with a position information of the image.

The touch display device may be fabricated such that an individual touch panel is attached to a display panel. Alternatively, the touch display device may be fabricated such that a touch panel is formed on a substrate of a display panel as an integrated shape. Recently, for slimness of a portable terminal such as a smart phone and a tablet PC, a demand for an in-cell touch display device where a touch panel and a display panel are integrated by using an electrode or a line for the display panel as an electrode and a line for a touch panel has increased.

The in-cell type touch display device may improve a touch sensitivity by applying a modified common voltage and a modified gate voltage instead of a common voltage and a gate voltage to a common line and a gate line, respectively, during a touch period for sensing a touch.

Figure 1:
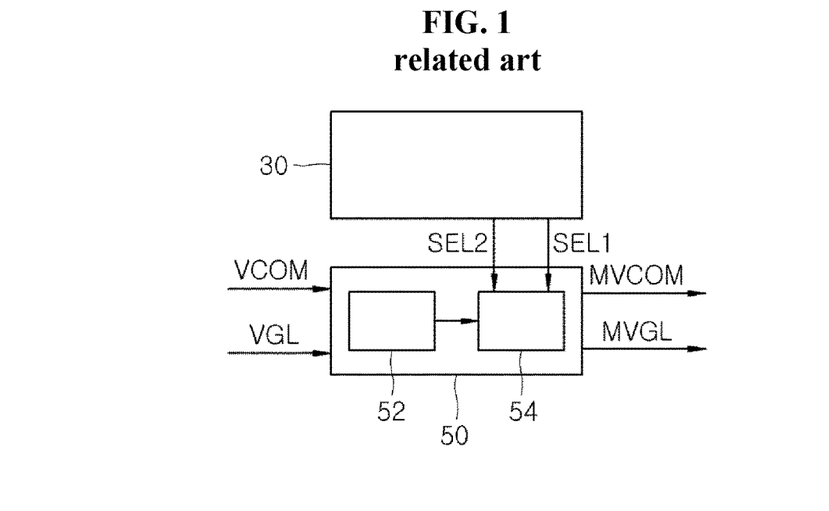
FIG. 1 is a view showing a power unit of a touch display device according to the related art.

FIG. 1 is a view showing a power unit of a touch display device according to the related art.

In FIG. 1, a power unit of a touch display device according to the related art includes a micro controlling unit 30 and a touch power unit 50.

The touch display device according to the related art displays an image during a display period and senses a touch during a touch period. During the display period, a modified common voltage MVCOM the same as a common voltage VCOM and a modified gate voltage the same as a gate voltage are applied to a common line and a gate line, respectively. During the touch period, the modified common voltage different from the common voltage and the modified gate voltage different from the gate voltage are applied to the common line and the gate line, respectively.

The micro controlling unit 30 generates first and second selecting signals SEL1 and SEL2 and supplies the first and second selecting signals SEL1 and SEL2 to the touch power unit 50. The touch power unit 50 generates and outputs the modified common voltage MVCOM and a modified gate low voltage MVGL from the common voltage VCOM and a gate low voltage VGL according the first and second selecting signals SEL1 and SEL2.

The touch power unit 50 includes a multiplexer (MUX) input part 52 and a MUX part 54. The MUX input part 52 generates a plurality of MUX input voltages for generation of the modified common voltage MVCOM and the modified gate low voltage MVGL and transmits the plurality of MUX input voltages to the MUX part 54. The MUX part 54 generates the modified common voltage MVCOM and the modified gate low voltage MVGL by selecting one of the common voltage VCOM, the gate low voltage VGL and the plurality of MUX input voltages according to the first and second selecting signals SEL1 and SEL2.

During the display period for image display, the modified common voltage MVCOM equal to the common voltage VCOM is applied to the common line and the modified gate voltage including the modified gate low voltage MVGL equal to the gate low voltage VGL is applied to the gate line. As a result, the plurality of MUX input voltages different from the common voltage VCOM and the gate low voltage VGL are not required.

During the display period, since the MUX part 54 selects the common voltage VCOM and the gate low voltage VGL according to the first and second selecting signals SEL1 and SEL2 and intactly outputs the common voltage VCOM and the gate low voltage VGL as the modified common voltage MVCOM and the modified gate low voltage MVGL, respectively, the plurality of MUX input voltages generated by the MUX input part 52 are not used by the MUX part 54.

However, since the MUX input part 52 consistently generates the plurality of MUX input voltages not used by the MUX part 52, a power consumption of the touch display device according to the related art increases.

BRIEF SUMMARY

Aspects of the present disclosure relate to a touch display device where a power consumption is reduced by deactivating a multiplexer (MUX) input part of a touch power unit during a display period and a method of driving the touch display device.

One or more aspects relate to a touch display device where a structure is simplified and a fabrication cost is reduced by generating a selecting signal for deactivating a MUX input part of a touch power unit using a selecting signal of a micro controlling unit.

Advantages and features of the disclosure will be set forth in part in the description, which follows and in part will become apparent to those having ordinary skill in the art upon examination of the following or may be learned from practice of the disclosure. Other advantages and features of the aspects herein may be realized and attained by the structure particularly pointed out in the written description and claims hereof as well as the appended drawings.

It is to be understood that both the foregoing general description and the following detailed description are explanatory, and are intended to provide further explanation of the aspects as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of aspects of the disclosure.

In the drawings.

DETAILED DESCRIPTION

Reference will now be made in detail to aspects of the present disclosure, examples of which are illustrated in the accompanying drawings. In the following description, when a detailed description of well-known functions or configurations related to this document is determined to unnecessarily cloud a gist of an aspect of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
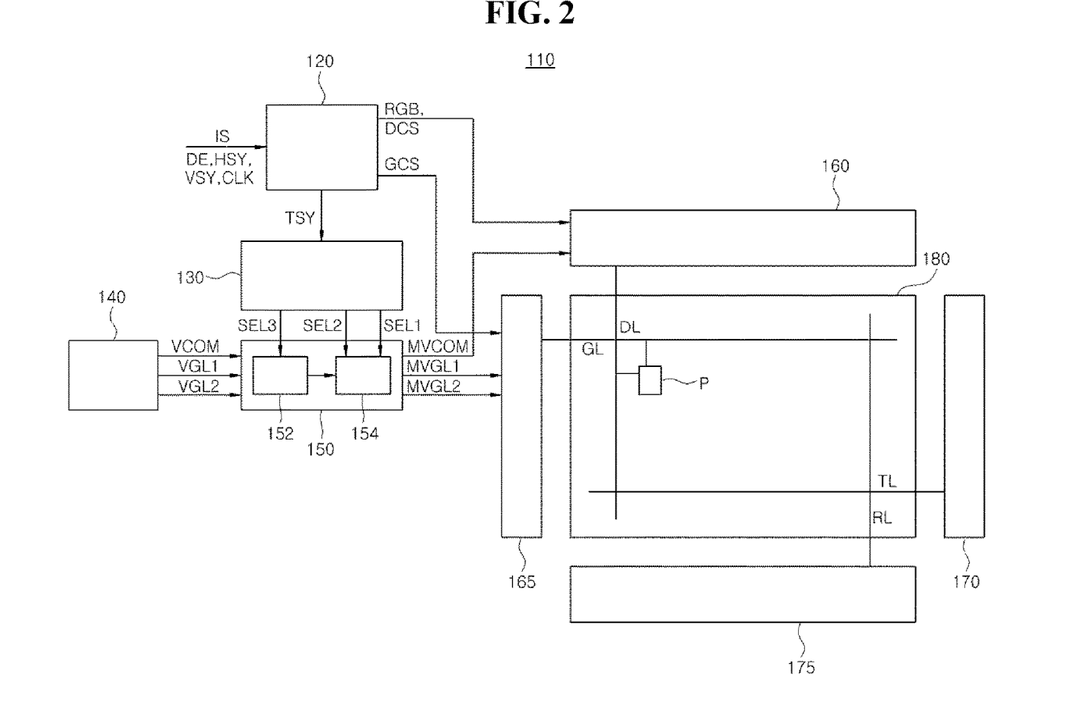
FIG. 2 is a view showing a touch display device according to a first embodiment of the present disclosure.

FIG. 2 is a view showing a touch display device according to a first embodiment of the present disclosure.

In FIG. 2, a touch display device 110 according to a first embodiment of the present disclosure includes a timing controlling unit 120, a micro controlling unit 130, a power managing unit 140, a touch power unit 150, a data driving unit 160, a gate driving unit 165, a touch transmitting unit 170, a touch receiving unit 175 and a touch display panel 180. The touch display device 110 may include one of an organic light emitting diode (OLED) display device and a liquid crystal display (LCD) device.

Figure 5:
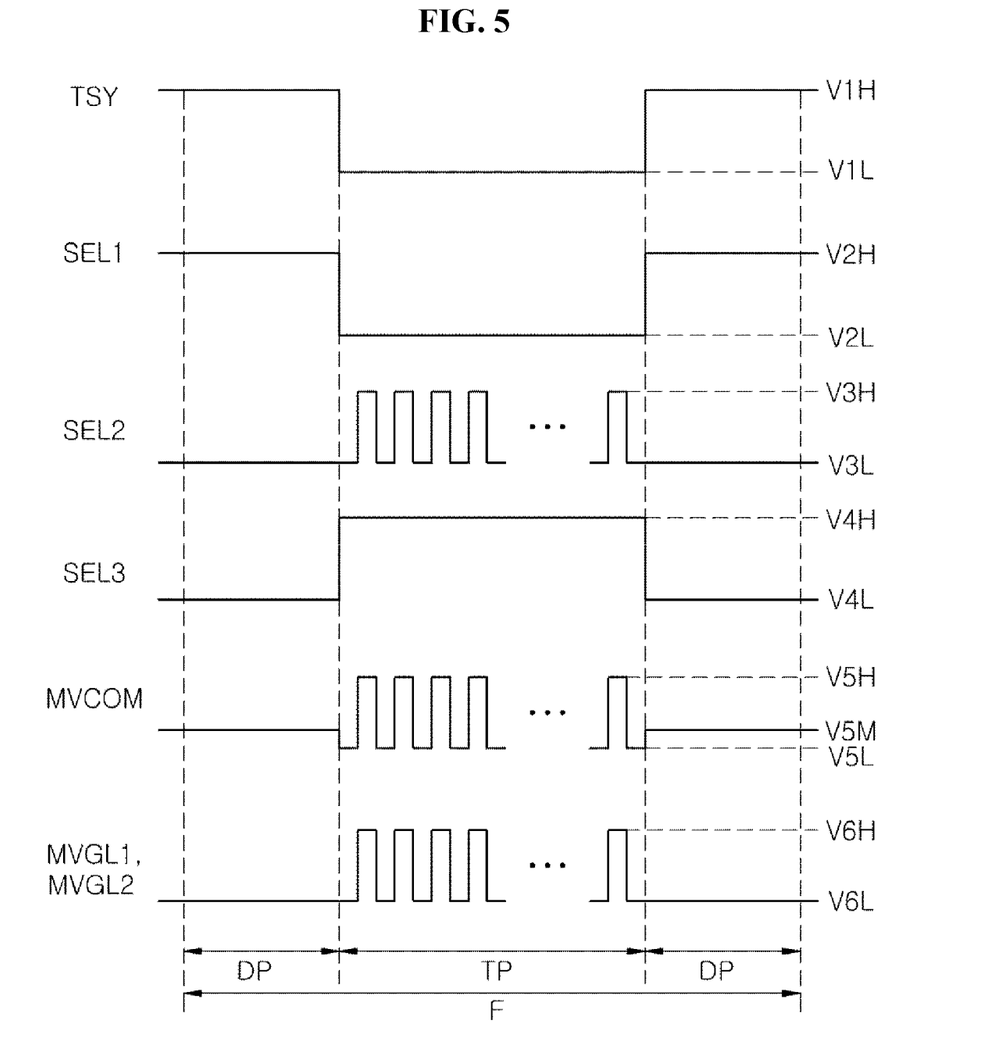
FIG. 5 is a waveform diagram showing input voltages and output voltages of a touch power unit of a touch display device according to a first embodiment of the present disclosure.

The touch display device 110 is driven by classifying one frame F (of FIG. 5) into a display period DP (of FIG. 5) and a touch period TP (of FIG. 5). During the display period DP, a data voltage, a modified gate voltage including first and second modified gate low voltages MVGL1 and MVGL2 and a modified common voltage MVCOM are applied to a data line DL, a gate line GL and a common line (not shown), respectively, to display an image. During the touch period TP, a touch transmitting signal is applied to a touch transmitting line TL and a touch receiving voltage is read from a touch receiving line RL to sense a touch.

During the display period DP, the modified common voltage MVCOM equal to the common voltage VCOM is applied to the common line, and the modified gate voltage including the first and second modified gate low voltages MVGL1 and MVGL2 equal to first and second gate low voltages VGL1 and VGL2, respectively, is applied to the gate line GL to display an image.

During the touch period TP, the modified common voltage MVCOM corresponding to the touch transmitting voltage is applied to the common line, and the modified gate voltage including the first and second modified gate low voltages MVGL1 and MVGL2 corresponding to the touch transmitting voltage is applied to the gate line GL. As a result, parasitic capacitances between the touch transmitting line TL and the common line and between the touch transmitting line TL and the gate line GL are reduced, and a touch sensitivity is improved.

The timing controlling unit 120 generates a touch synchronizing signal TSY, an image data RGB, a data controlling signal DCS and a gate controlling signal GCS using an image signal IS and a plurality of timing signals such as a data enable signal DE, a horizontal synchronizing signal HSY, a vertical synchronizing signal VSY and a clock CLK transmitted from an external system such as a graphic card and a television set. The timing controlling unit 120 transmits the touch synchronizing signal TSY to the micro controlling unit 130, transmits the image data RGB and the data controlling signal DCS to the data driving unit 160, and transmits the gate controlling signal GCS to the gate driving unit 165.

The micro controlling unit 130 generates first, second and third selecting signals SEL1, SEL2 and SEL3 using the touch synchronizing signal TSY and transmits the first, second and third selecting signals SEL1, SEL2 and SEL3 to the touch power unit 150.

For example, the micro controlling unit 130 means a computer having a single chip of a microprocessor and an input/output module and performing a predetermined function. The micro controlling unit 130 may include a central processing unit (CPU), a memory and a programmable input/output.

The power managing unit 140 generates the common voltage VCOM and the first and second gate low voltages VGL1 and VGL2 and transmits the common voltage VCOM and the first and second gate low voltages VGL1 and VGL2 to the touch power unit 150.

The first and second gate low voltages VGL1 and VGL2 may be used to sequentially turn on first and second pull-down transistors, respectively, of a shift register of the gate driving unit 165.

For example, the power managing unit 140 may include a power management integrated circuit (PMIC) generating and outputting a plurality of power voltages.

The touch power unit 150 generates the modified common voltage MVCOM and the first and second modified gate low voltages MVGL1 and MVGL2 from the common voltage VCOM and the first and second gate low voltages VGL1 and VGL2 according to the first, second and third selecting signals SEL1, SEL2 and SEL3. The touch power unit 150 transmits the modified common voltage MVCOM to the data driving unit 160 and transmits the first and second modified gate low voltages MVGL1 and MVGL2 to the gate driving unit 165.

The touch power unit 150 includes a multiplexer (MUX) input part 152 and a MUX part 154. Both the MUX input part and the MUX part include circuits composed of various transistors, switches and other circuit components organized in manner to carry out the functions as described herein. The MUX input part 152 generates a plurality of MUX input voltages for generation of the modified common voltage MVCOM and the first and second modified gate low voltages MVGL1 and MVGL2 according to the third selecting signal SEL3 and transmits the plurality of MUX input voltages to the MUX part 154. The MUX part 154 generates and outputs the modified common voltage MVCOM and the first and second modified gate low voltages MVGL1 and MVGL2 by selecting one of the common voltage VCOM, the first and second gate low voltages VGL1 and VGL2 and the plurality of MUX input voltages according to the first and second selecting signals SEL1 and SEL2.

For example, the touch power unit 150 may include a touch power integrated circuit (TPIC) generating and outputting a plurality of modified voltages and a touch transmitting voltage.

The data driving unit 160 generates a data voltage (data signal) using the data controlling signal DCS and the image data RGB transmitted from the timing controlling unit 120 and applies the data voltage to the data line DL of the touch display panel 180.

In addition, the data driving unit 160 applies the modified common voltage MVCOM transmitted from the touch power unit 150 to the common line of the touch display panel 180.

The gate driving unit 165 generates the modified gate voltage (modified gate signal) using the gate controlling signal GCS transmitted from the timing controlling unit 120 and the first and second gate low voltages MVGL1 and MVGL2 transmitted from the touch power unit 150 and applies the modified gate voltage to the gate line GL of the touch display panel 180.

The gate driving unit 165 may have a gate-in-panel (GIP) type such that the gate driving unit 165 is formed on a substrate of the touch display panel 180 having the gate line GL, the data line DL and a pixel (P) thereon.

The gate driving unit 165 of a GIP type may include a shift register. To prevent deterioration of an output portion of the shift register, first and second pull-down transistors may be formed in the output portion and may be sequentially turned on using the first and second modified gate low voltages MVGL1 and MVGL2 by a frame.

The touch transmitting unit 170 applies the touch transmitting voltage to the touch transmitting line TL of the touch display panel 180 according to the touch synchronizing signal TSY of the timing controlling unit 120 during the touch period. The touch power unit 150 may generate the touch transmitting voltage and may transmit the touch transmitting voltage to the touch transmitting unit 170.

The touch receiving unit 175 reads the touch receiving voltage from the touch receiving line RL of the touch display panel 180 according to the touch synchronizing signal TSY of the timing controlling unit 120 during the touch period to sense the touch.

The touch display panel 180 displays the image using the modified gate voltage and the data voltage and senses the touch using the touch transmitting voltage and the touch receiving voltage. The touch display panel 180 includes the gate line GL and the data line DL crossing each other to define the pixel P, the pixel connected to the gate line GL and the data line DL, the touch transmitting line TL and the touch receiving line RL.

When the touch display device 110 is an OLED display device, the pixel P of the touch display panel 180 may include a switching thin film transistor (TFT), a driving TFT, a storage capacitor and a light emitting diode. When the touch display device 110 is an LCD device, the pixel P of the touch display panel 180 may include a TFT, a storage capacitor and a liquid crystal capacitor.

The touch display device 110 may reduce a power consumption by deactivating the MUX input part 152 of the touch power unit 150 according to the third selecting signal SEL3 during the display period DP displaying an image.

Figure 3:
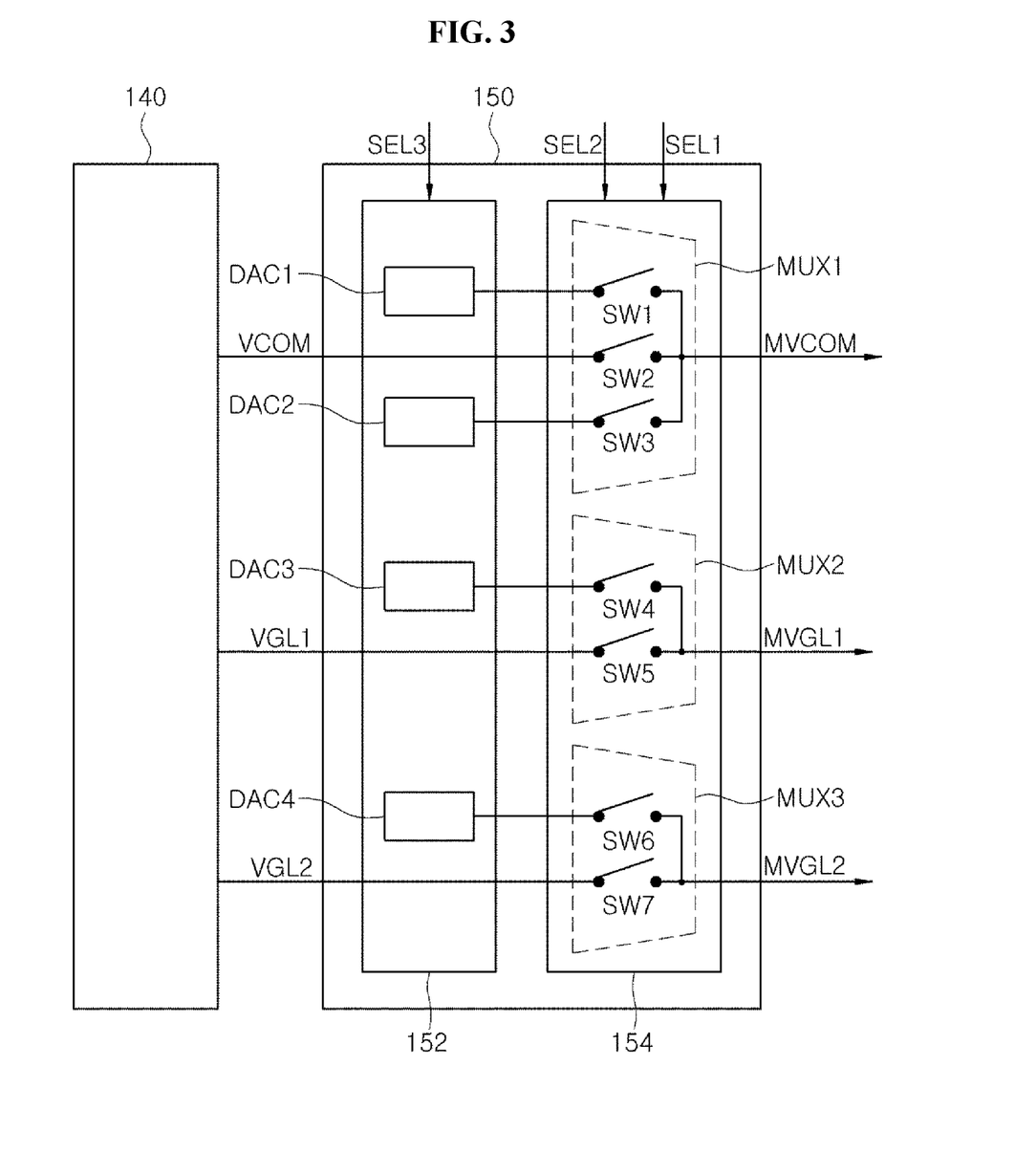
FIG. 3 is a view showing a touch power unit of a touch display device according to a first embodiment of the present disclosure.
Figure 4:
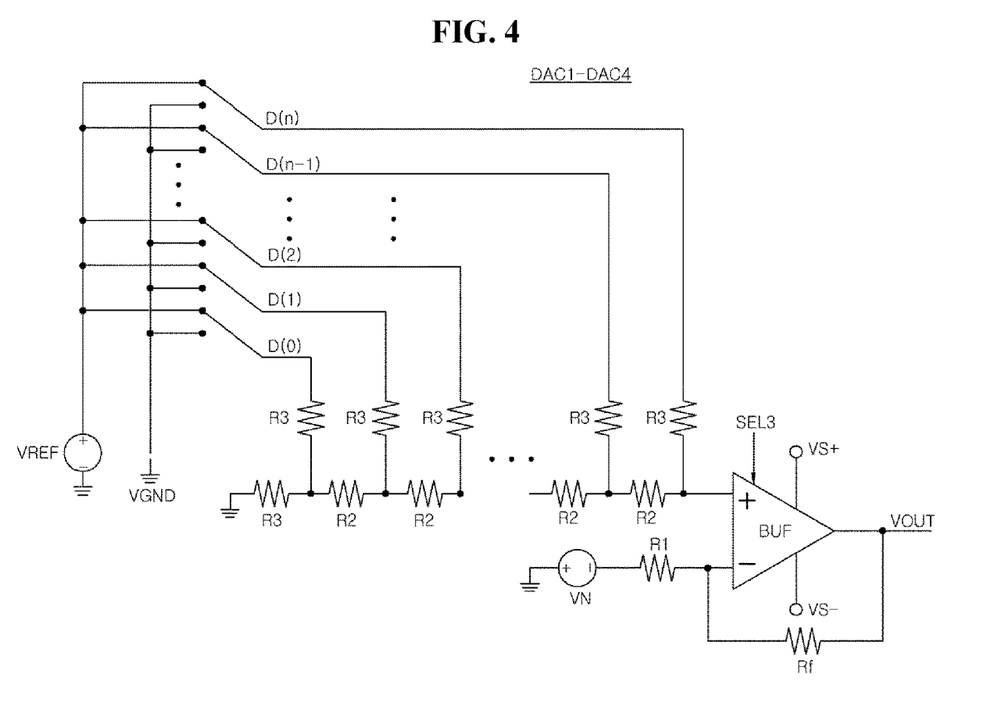
FIG. 4 is a view showing a MUX input part of a touch power unit of a touch display device according to a first embodiment of the present disclosure.

FIG. 3 is a view showing a touch power unit of a touch display device according to a first embodiment of the present disclosure, FIG. 4 is a view showing a MUX input part of a touch power unit of a touch display device according to a first embodiment of the present disclosure, and FIG. 5 is a waveform diagram showing input voltages and output voltages of a touch power unit of a touch display device according to a first embodiment of the present disclosure.

In FIG. 3, the power managing unit 140 generates the common voltage VCOM and the first and second gate low voltages VGL1 and VGL2 and transmits the common voltage VCOM and the first and second gate low voltages VGL1 and VGL2 to the touch power unit 150. The touch power unit 150 generates the modified common voltage MVCOM and the first and second modified gate low voltages MVGL1 and MVGL2 from the common voltage VCOM and the first and second gate low voltages VGL1 and VGL2 according to the first, second and third selecting signals SEL1, SEL2 and SEL3.

The touch power unit 150 includes the MUX input part 152 and the MUX part 154. The MUX input part 152 includes first to fourth converters DAC1 to DAC4, and the MUX part 154 includes first to third MUXs, MUX1, MUX2 and MUX3.

Each of the first to fourth converters DAC1 to DAC4 may include a digital to analog converter (DAC) generating first to fourth MUX input voltages by converting a digital signal to an analog signal. Each of the first to third MUXs MUX1 to MUX3 may include a multiplexer selecting one from the plurality of MUX input voltages according to the first and second selecting signals SEL1 and SEL2.

The common voltage VCOM of the power managing unit 140 and the first and second MUX input voltages of the first and second converters DAC1 and DAC2 are inputted to the first MUX, MUX1. The first MUX, MUX1, may include first to third switches SW1 to SW3. The first MUX, MUX1, may output a fifth middle level voltage V5M (of FIG. 5) of the common voltage VCOM as the modified common voltage MVCOM according to the first and second selecting signals SEL1 and SEL2 during the display period DP and may output a fifth high level voltage V5H (of FIG. 5) and a fifth low level voltage V5L (of FIG. 5) of the first and second MUX input voltages as the modified common voltage MVCOM according to the first and second selecting signals SEL1 and SEL2 during the touch period TP.

As a result, the modified common voltage MVCOM may have a constant voltage of the fifth middle level voltage V5M during the display period and may have a plurality of pulse voltages changing between the fifth high level voltage V5H and the fifth low level voltage V5L during the touch period TP.

The first gate low voltage VGL1 of the power managing unit 140 and the third MUX input voltage of the third converter DAC3 are inputted to the second MUX, MUX2. The second MUX, MUX2, may include fourth and fifth switches SW4 to SW5. The second MUX, MUX2, may output a sixth low level voltage V6L (of FIG. 5) of the first gate low voltage VGL1 as the modified common voltage MVCOM according to the first and second selecting signals SEL1 and SEL2 during the display period DP and may output a sixth low level voltage V6L of the first gate low voltage VGL1 and a sixth high level voltage V6H (of FIG. 5) of the third MUX input voltage as the first modified gate low voltage MVGL1 according to the first and second selecting signals SEL1 and SEL2 during the touch period TP.

As a result, the first modified gate low voltage MVGL1 may have a constant voltage of the sixth low level voltage V6L during the display period and may have a plurality of pulse voltages changing between the sixth high level voltage V6H and the sixth low level voltage V6L during the touch period TP.

In addition, the second gate low voltage VGL2 of the power managing unit 140 and the fourth MUX input voltage of the fourth converter DAC4 are inputted to the third MUX, MUX3. The third MUX, MUX3, may include sixth and seventh switches SW6 to SW7. The third MUX, MUX3, may output the sixth low level voltage V6L of the second gate low voltage VGL2 as the first modified gate low voltage MVGL1 according to the first and second selecting signals SEL1 and SEL2 during the display period DP and may output the sixth low level voltage V6L of the second gate low voltage VGL2 and the sixth high level voltage V6H of the fourth MUX input voltage as the second modified gate low voltage MVGL2 according to the first and second selecting signals SEL1 and SEL2 during the touch period TP.

As a result, the second modified gate low voltage MVGL2 may have a constant voltage of the sixth low level voltage V6L during the display period and may have a plurality of pulse voltages changing between the sixth high level voltage V6H and the sixth low level voltage V6L during the touch period TP.

Specifically, the first to fourth converters DAC1 to DAC4 is activated (enable) according to the third selecting signal SEL3 during the touch period TP to generate the first to fourth MUX input voltages and is deactivated (disable) according to the third selecting signal SEL3 during the display period DP not to generate the first to fourth MUX input voltages. As a result, a power consumption is reduced.

In FIG. 4, each of the first to fourth converters DAC1 to DAC4 includes a buffer BUF outputting an output voltage VOUT, a reference resistor Rf and first to third resistors R1 to R3 connected to the buffer BUF, a reference power source VREF and an input power source VN.

For example, the buffer BUF may include an operational amplifier (OP AMP) having an inverting terminal (−) and a non-inverting terminal (+) and using a high level voltage (VS+) and a low level voltage (VS−) as a power source. A first end of the first resistor R1 is connected to the inverting terminal (−) of the buffer BUF, and a second end of the first resistor R1 is connected to the input power source VN.

The reference resistor Rf is connected between the inverting terminal (−) and an output terminal of the buffer BUF.

The plurality of second resistors R2 and the plurality of third resistors R3 are connected to the non-inverting terminal (+) of the buffer BUF in series.

A first end of each of the plurality of third resistors R3 is connected between the plurality of second resistors R2, and a second end of each of the plurality of third resistors R3 is connected to one of the reference power source VREF and a ground power source VGND through a plurality of switches.

A plurality of bits D(0) to D(n) of a digital signal may be inputted to the non-inverting terminal (+) of the buffer BUF according to operation of the plurality of switches, and the output voltage VOUT of an analog signal may be outputted as the first to fourth MUX input voltages from the buffer BUF.

The buffer BUF is activated (enable) or deactivated (disable) according to the third selecting signal SEL3. The buffer BUF is activated according to the third selecting signal SEL3 during the touch period TP to output the first to fourth MUX input voltages as the output voltage VOUT, and the buffer BUF is deactivated according to the third selecting signal SEL3 during the display period DP to reduce the power consumption.

In FIG. 5, the touch synchronizing signal TSY generated by the timing controlling unit 120 has a first high level voltage V1H during the display period DP and has a first low level voltage V1L smaller than the first high level voltage V1H during the touch period TP.

The first selecting signal SEL1 generated by the micro controlling unit 130 has a second high level voltage V2H during the display period DP and has a second low level voltage V2L smaller than the second high level voltage V2H during the touch period TP.

The second selecting signal SEL2 generated by the micro controlling unit 130 has a third low level voltage V3L during the display period DP and has a plurality of pulse voltages changing between the third low level voltage V3L and a third high level voltage V3H greater than the third low level voltage V3L during the touch period TP.

The third selecting signal SEL3 generated by the micro controlling unit 130 has a polarity opposite to the first selecting signal SEL1. The third selecting signal SEL3 has a fourth low level voltage V4L during the display period DP and has a fourth high level voltage V4H greater than the fourth low level voltage V4L during the touch period TP.

The first MUX, MUX1, selects a fifth middle level voltage V5M of the common voltage VCOM and outputs the fifth middle level voltage V5M as the modified common voltage MVCOM during the display period where the first selecting signal SEL1 has the second high level voltage V2H and the second selecting signal SEL2 has the third low level voltage V3L. The first MUX, MUX1, selects the fifth high level voltage V5H of the first MUX input voltage and outputs the fifth high level voltage V5H as the modified common voltage MVCOM during the touch period where the first selecting signal SEL1 has the second low level voltage V2L and the second selecting signal SEL2 has the third high level voltage V3H. The first MUX, MUX1, selects the fifth high level voltage V5H of the second MUX input voltage and outputs the fifth high level voltage V5H as the modified common voltage MVCOM during the touch period where the first selecting signal SEL1 has the second low level voltage V2L and the second selecting signal SEL2 has the third low level voltage V3L.

Each of the second and third MUXs, MUX2 and MUX3, selects the sixth low level voltage V6L of the first and second gate low voltages VGL1 and VGL2 and outputs the sixth low level voltage V6L as the first and second modified gate low voltages MVGL1 and MVGL2 during the display period and the touch period where the first selecting signal SEL1 has the second high level voltage V2H and the second selecting signal SEL2 has the third low level voltage V3L. Each of the second and third MUXs MUX2 and MUX3 selects the sixth high level voltage V6H of the third and fourth MUX input voltages and outputs the sixth high level voltage V6H as the first and second modified gate low voltages MVGL1 and MVGL2 during the touch period where the first selecting signal SEL1 has the second low level voltage V2L and the second selecting signal SEL2 has the third high level voltage V3H.

Each of the first to fourth converters DAC1 to DAC4 is deactivated during the display period where the third selecting signal SEL3 has the fourth low level voltage V4L and is activated during the touch period TP where the third selecting signal SEL3 has the fourth high level voltage V4H greater than the fourth low level voltage V4L to generate the first to fourth MUX input voltages (fifth high level voltage VSH, fifth low level voltage VSL, sixth high level voltage V6H, sixth high level voltage V6H).

In the touch display device 110 according to the first embodiment of the present disclosure, the micro controlling unit 130 generates the first to third selecting signals SEL1 to SEL3 using the touch synchronizing signal TSY. During the touch period TP, the MUX input part 152 of the touch power unit 150 is activated according to the third selecting signal SEL3, and the MUX part 154 of the touch power unit 150 generates the modified common voltage MVCOM and the first and second modified gate low voltages MVGL1 and MVGL2 of a pulse voltage according to the first and second selecting signals SEL1 and SEL2. During the display period DP, the MUX input part 152 of the touch power unit 150 is deactivated according to the third selecting signal SEL3, and the MUX part 154 of the touch power unit 150 generates the modified common voltage MVCOM and the first and second modified gate low voltages MVGL1 and MVGL2 of a constant voltage according to the first and second selecting signals SEL1 and SEL2.

Since the MUX input part 152 of the touch power unit 150 is deactivated during the display period DP, the power consumption of the touch display device 110 is reduced.

In addition, since the third selecting signal SEL3 deactivating the MUX input part 152 of the touch power unit 150 is generated using the touch synchronizing signal TSY of the timing controlling unit 120 during the display period DP, a structure of the touch display device 110 is simplified and a fabrication cost of the touch display device 110 is reduced.

In another embodiment, the third selecting signal SEL3 may be generated using the first selecting signal SEL1 of the micro controlling unit 130.

Figure 6:
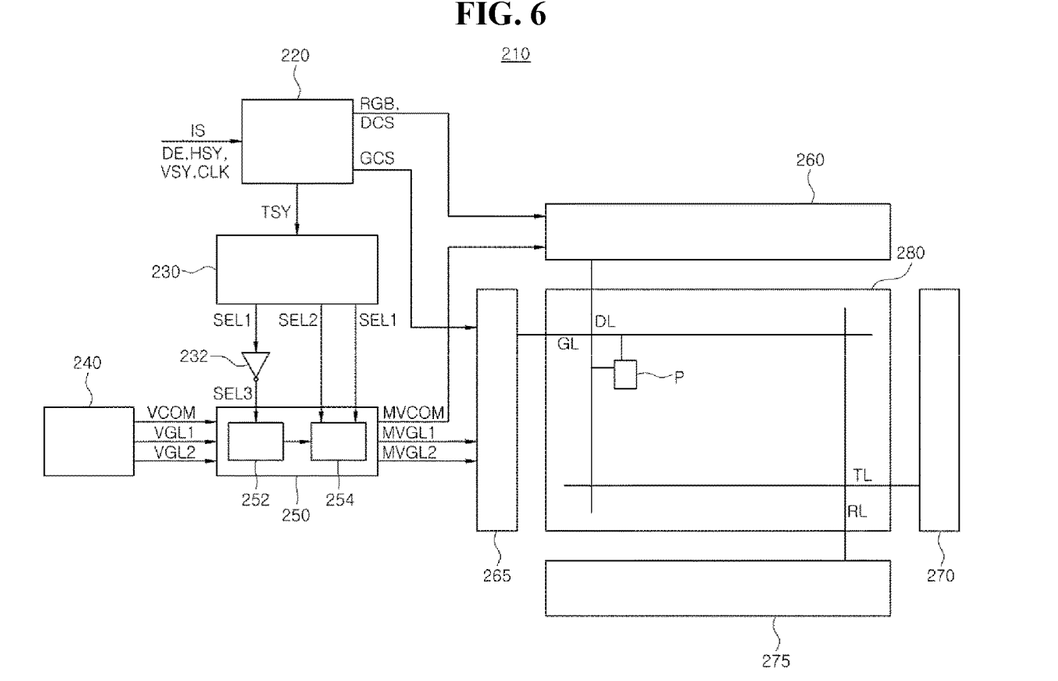
FIG. 6 is a view showing a touch display device according to a second embodiment of the present disclosure.

FIG. 6 is a view showing a touch display device according to a second embodiment of the present disclosure. Illustration for the parts of the second embodiment the same as those of the first embodiment will be omitted.

In FIG. 6, a touch display device 210 according to a second embodiment of the present disclosure includes a timing controlling unit 220, a micro controlling unit 230, a power managing unit 240, a touch power unit 250, a data driving unit 260, a gate driving unit 265, a touch transmitting unit 270, a touch receiving unit 275 and a touch display panel 280.

The touch display device 210 is driven by classifying one frame F (of FIG. 5) into a display period DP (of FIG. 5) and a touch period TP (of FIG. 5).

During the display period DP, a data voltage, a modified gate voltage including first and second modified gate low voltages MVGL1 and MVGL2 and a modified common voltage MVCOM are applied to a data line DL, a gate line GL and a common line (not shown), respectively, to display an image. During the touch period TP, a touch transmitting signal is applied to a touch transmitting line TL and a touch receiving voltage is read from a touch receiving line RL to sense a touch.

During the display period DP, the touch power unit 250 generates the modified common voltage MVCOM equal to the common voltage VCOM and the first and second modified gate low voltages MVGL1 and MVGL2 equal to the first and second gate low voltages VGL1 and VGL2 according to the first and second selecting signals SEL1 and SEL2. The data driving unit 260 applies the modified common voltage MVCOM to the common line and the gate driving unit 265 applies the modified gate voltage including the first and second modified low voltages MVGL1 and MVGL2 to the gate line GL to display an image.

During the touch period TP, the touch power unit 250 generates the modified common voltage MVCOM and the first and second modified gate low voltages MVGL1 and MVGL2 corresponding to the touch transmitting voltage according to the first and second selecting signals SEL1 and SEL2. The data driving unit 260 applies the modified common voltage MVCOM to the common line and the gate driving unit 265 applies the modified gate voltage including the first and second modified low voltages MVGL1 and MVGL2 to the gate line GL. As a result, parasitic capacitances between the touch transmitting line TL and the common line and between the touch transmitting line TL and the gate line GL are reduced, and a touch sensitivity is improved.

Specifically, an inverter 232 inverts the first selecting signal SEL1 to generate the third selecting signal SEL3 and transmits the third selecting signal SEL3 to the MUX input part 252 of the touch power unit 250.

Accordingly, the MUX input part 252 is activated according to the third selecting signal SEL3 to generate first to fourth MUX input voltages during the touch period TP and is deactivated not to generate the first to fourth MUX input voltages during the display period DP. As a result, the power consumption is reduced.

In the touch display device 210 according to the second embodiment of the present disclosure, the micro controlling unit 230 generates the first and second selecting signals SEL1 and SEL2 using the touch synchronizing signal TSY and the inverter 232 generates the third selecting signal SEL3 using the first selecting signal SEL1. During the touch period TP, the MUX input part 252 of the touch power unit 250 is activated according to the third selecting signal SEL3, and the MUX part 254 of the touch power unit 250 generates the modified common voltage MVCOM and the first and second modified gate low voltages MVGL1 and MVGL2 of a pulse voltage according to the first and second selecting signals SEL1 and SEL2. During the display period DP, the MUX input part 252 of the touch power unit 250 is deactivated according to the third selecting signal SEL3, and the MUX part 254 of the touch power unit 250 generates the modified common voltage MVCOM and the first and second modified gate low voltages MVGL1 and MVGL2 of a constant voltage according to the first and second selecting signals SEL1 and SEL2.

Since the MUX input part 252 of the touch power unit 250 is deactivated during the display period DP, the power consumption of the touch display device 210 is reduced.

In addition, since the third selecting signal SEL3 deactivating the MUX input part 252 of the touch power unit 250 is generated using the first selecting signal SEL1 of the power managing unit 230 during the display period DP, a structure of the touch display device 210 is simplified and a fabrication cost of the touch display device 210 is reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device, comprising:
   a timing controlling unit generating a touch synchronizing signal, an image data, a data controlling signal and a gate controlling signal;
   a micro controlling unit generating first, second and third selecting signals using the touch synchronizing signal;
   a touch power unit including a MUX input circuit and a MUX circuit, the MUX input circuit deactivated during a display period and activated to generate a plurality of MUX input voltages during a touch period according to the third selecting signal, the MUX circuit generating a modified common voltage and first and second modified gate low voltages from a common voltage, first and second gate low voltages and the plurality of MUX input voltages according to the first and second selecting signals;
   a data driving unit generating a data voltage using the image data and the data controlling signal;
   a gate driving unit generating a modified gate voltage using the gate controlling signal and the first and second modified gate low voltages; and
   a touch display panel displaying an image using the data voltage and the modified gate voltage during the display period and sensing a touch using a touch transmitting voltage and a touch receiving voltage during the touch period,
   wherein the third selecting signal has a polarity opposite to the first selecting signal.

2. The device of claim 1, wherein the micro controlling unit includes an inverter generating the third selecting signal by inverting the first selecting signal.

3. The device of claim 1, wherein the MUX input circuit includes first, second, third and fourth converters generating first, second, third and fourth MUX input voltages, respectively, according to the third selecting signal, and
   wherein the MUX circuit includes a first MUX selecting and outputting one of the common voltage and the first and second MUX input voltages as the modified common voltage according to the first and second selecting signals, a second MUX selecting and outputting one of the first gate low voltage and the third MUX input voltage as the first modified gate low voltage according to the first and second selecting signals and a third MUX selecting and outputting one of the second gate low voltage and the fourth MUX input voltage as the second modified gate low voltage according to the first and second selecting signals.

4. The device of claim 3, wherein each of the first, second, third and fourth converters includes a buffer outputting the first, second, third and fourth MUX input voltages, and
   wherein the buffer is deactivated during the display period and is activated during the touch period according to the third selecting signal.

5. The device of claim 1, wherein the modified common voltage and the first and second modified gate low voltages have a voltage that is the same as the common voltage and the first and second gate low voltages, respectively, during the display period and have a voltage corresponding to the touch transmitting voltage during the touch period.

6. A method of driving a touch display device, comprising:
   generating a touch synchronizing signal, an image data, a data controlling signal and a gate controlling signal by a timing controlling unit;
   generating first, second and third selecting signals using the touch synchronizing signal by a micro controlling unit, the third selecting signal having a polarity opposite to the first selecting signal;
   generating a plurality of MUX input voltages by a MUX input circuit, the MUX input circuit deactivated during a display period and activated during a touch period according to the third selecting signal;
   generating a modified common voltage and first and second modified gate low voltages from a common voltage, first and second gate low voltages and the plurality of MUX input voltages according to the first and second selecting signals by a MUX circuit;
   generating a data voltage using the image data and the data controlling signal by a data driving unit;
   generating a modified gate voltage using the gate controlling signal and the first and second modified gate low voltages by a gate driving unit; and
   displaying an image using the data voltage and the modified gate voltage during the display period and sensing a touch using a touch transmitting voltage and a touch receiving voltage during the touch period by a touch display panel.

7. The method of claim 6, wherein generating the third selecting signal includes inverting the first selecting signal by an inverter.

8. The method of claim 6, wherein generating the plurality of MUX input signals includes generating first, second, third and fourth MUX input voltages according to the third selecting signal,
   wherein generating the modified common voltage includes selecting one of the common voltage and the first and second MUX input voltages according to the first and second selecting signals,
   wherein generating the first modified gate low voltage includes selecting one of the first gate low voltage and the third MUX input voltage according to the first and second selecting signals, and wherein generating the second modified gate low voltage includes selecting one of the second gate low voltage and the fourth MUX input voltage according to the first and second selecting signals.

9. The method of claim 6, wherein the modified common voltage and the first and second modified gate low voltages have a voltage that is the same as the common voltage and the first and second gate low voltages, respectively, during the display period and have a voltage corresponding to the touch transmitting voltage during the touch period.

10. The device of claim 1, wherein the MUX input circuit includes first, second, third and fourth converters generating first, second, third and fourth MUX input voltages, respectively.

11. The device of claim 10, wherein each of the first, second, third and fourth converters includes a buffer,
wherein the buffer is deactivated during the display period and is activated during the touch period.

12. A touch display device, comprising:
a timing controlling unit generating a touch synchronizing signal, an image data, a data controlling signal and a gate controlling signal;
a micro controlling unit generating first, second and third selecting signals using the touch synchronizing signal;
a touch power unit including a MUX input circuit and a MUX circuit, the MUX input circuit deactivated during a display period and activated to generate a plurality of MUX input voltages during a touch period according to the third selecting signal, the MUX circuit generating a modified common voltage and first and second modified gate low voltages from a common voltage, first and second gate low voltages and the plurality of MUX input voltages according to the first and second selecting signals;
a data driving unit generating a data voltage using the image data and the data controlling signal;
a gate driving unit generating a modified gate voltage using the gate controlling signal and the first and second modified gate low voltages; and
a touch display panel displaying an image using the data voltage and the modified gate voltage during the display period and sensing a touch using a touch transmitting voltage and a touch receiving voltage during the touch period,
wherein the MUX input circuit includes first, second, third and fourth converters generating first, second, third and fourth MUX input voltages, respectively, according to the third selecting signal.

13. The device of claim 12, wherein the MUX circuit includes a first MUX selecting and outputting one of the common voltage and the first and second MUX input voltages as the modified common voltage according to the first and second selecting signals, a second MUX selecting and outputting one of the first gate low voltage and the third MUX input voltage as the first modified gate low voltage according to the first and second selecting signals and a third MUX selecting and outputting one of the second gate low voltage and the fourth MUX input voltage as the second modified gate low voltage according to the first and second selecting signals.

14. The device of claim 12, wherein each of the first, second, third and fourth converters includes a buffer,
wherein the buffer is deactivated during the display period and is activated during the touch period according to the third selecting signal.

15. The device of claim 12, wherein the modified common voltage and the first and second modified gate low voltages have a voltage that is the same as the common voltage and the first and second gate low voltages, respectively, during the display period and have a voltage corresponding to the touch transmitting voltage during the touch period.

16. The device of claim 12, wherein the third selecting signal is generated based on the first selecting signal.

17. The device of claim 12, wherein the micro controlling unit includes an inverter generating the third selecting signal by inverting the first selecting signal.

18. The device of claim 12, wherein the MUX circuit includes a first MUX selecting and outputting one of the common voltage and the first and second MUX input voltages as the modified common voltage according to the first and second selecting signals.

19. The device of claim 12, wherein the MUX circuit includes a second MUX selecting and outputting one of the first gate low voltage and the third MUX input voltage as the first modified gate low voltage according to the first and second selecting signals.

20. The device of claim 12, wherein the MUX circuit includes a third MUX selecting and outputting one of the second gate low voltage and the fourth MUX input voltage as the second modified gate low voltage according to the first and second selecting signals.

* * * * *